US 11,199,509 B2

(12) United States Patent
Sakuyama et al.

(10) Patent No.: US 11,199,509 B2
(45) Date of Patent: Dec. 14, 2021

(54) INSPECTION APPARATUS AND INSPECTION METHOD

(71) Applicant: SCREEN HOLDINGS CO., LTD., Kyoto (JP)

(72) Inventors: Tsutomu Sakuyama, Kyoto (JP); Shohei Otsuki, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 172 days.

(21) Appl. No.: 16/493,076

(22) PCT Filed: Nov. 13, 2017

(86) PCT No.: PCT/JP2017/040736
§ 371 (c)(1),
(2) Date: Sep. 11, 2019

(87) PCT Pub. No.: WO2018/168067
PCT Pub. Date: Sep. 20, 2018

(65) Prior Publication Data
US 2021/0140898 A1 May 13, 2021

(30) Foreign Application Priority Data
Mar. 13, 2017 (JP) .............................. JP2017-047284

(51) Int. Cl.
*G01N 21/952* (2006.01)
*G01M 13/021* (2019.01)
(Continued)

(52) U.S. Cl.
CPC ........ *G01N 21/952* (2013.01); *G01M 13/021* (2013.01); *G01N 21/8806* (2013.01); *G01N 21/9515* (2013.01)

(58) Field of Classification Search
CPC ............ G01B 11/2433; G01B 11/2425; G01B 11/2416; G01B 11/24; G01B 5/204; G01B 5/163; G01B 7/148; G01N 21/88
(Continued)

(56) References Cited

U.S. PATENT DOCUMENTS

| 4,373,804 A | 2/1983 | Pryor et al. |
| 8,723,946 B2 | 5/2014 | Takahashi et al. |

(Continued)

FOREIGN PATENT DOCUMENTS

| CN | 103292993 A | 9/2013 |
| CN | 204154661 U | 2/2015 |

(Continued)

OTHER PUBLICATIONS

Extended European Search Report issued in corresponding European Patent Application No. 17901221.6-1230, dated Nov. 26, 2020.

(Continued)

*Primary Examiner* — Hoa Q Pham
(74) *Attorney, Agent, or Firm* — McDermott Will & Emery LLP

(57) ABSTRACT

An inspection apparatus for inspecting a workpiece having an outer peripheral portion rotationally symmetric about a symmetry axis with projections and recesses provided periodically and repeatedly, the apparatus comprises: an edge imaging mechanism that captures an image of an edge portion of a projection of a rotated workpiece; an upstream imaging mechanism that captures an image of an upstream wall surface of the rotated workpiece; and a downstream imaging mechanism that captures an image of a downstream wall surface of the rotated workpiece. The inspection apparatus inspects the workpiece on the basis of the images captured by the edge imaging mechanism, the upstream
(Continued)

imaging mechanism, and the downstream imaging mechanism.

10 Claims, 8 Drawing Sheets

(51) Int. Cl.
  *G01N 21/88* (2006.01)
  *G01N 21/95* (2006.01)
(58) Field of Classification Search
  USPC ....... 356/237.1–237.5, 601–635, 240.1, 426, 356/239.4; 73/162, 593; 382/152, 142
  See application file for complete search history.

(56) References Cited

U.S. PATENT DOCUMENTS

| | | | |
|---|---|---|---|
| 2006/0045324 A1* | 3/2006 | Katayama | G06T 7/001 382/142 |
| 2007/0291260 A1* | 12/2007 | Komori | G01B 11/2416 356/138 |
| 2011/0304856 A1 | 12/2011 | Ge et al. | |
| 2012/0033068 A1 | 2/2012 | Takahashi | |
| 2012/0069173 A1 | 3/2012 | Takahashi et al. | |
| 2017/0356824 A1 | 12/2017 | Zhang et al. | |
| 2021/0027440 A1* | 1/2021 | Sakuyama | G06T 3/40 |
| 2021/0164914 A1* | 6/2021 | Otsuki | G01N 21/952 |

FOREIGN PATENT DOCUMENTS

| | | |
|---|---|---|
| DE | 197 18 494 A1 | 11/1998 |
| JP | 52-129457 A | 10/1977 |
| JP | 56-16802 A | 2/1981 |
| JP | 01-233306 A | 9/1989 |
| JP | 02-79410 U | 6/1990 |
| JP | 05-1 57705 A | 6/1993 |
| JP | 10-132537 A | 5/1998 |
| JP | 2000-065749 A | 3/2000 |
| JP | 2003-302348 A | 10/2003 |
| JP | 3722085 B2 | 11/2005 |
| JP | 2012-002548 A | 1/2012 |
| JP | 2012-039350 A | 2/2012 |
| JP | 2012-063268 A | 3/2012 |
| JP | 2013-152128 A | 8/2013 |
| JP | 2014-074631 A | 4/2014 |
| JP | 2014-115222 A | 6/2014 |
| TW | M479416 U | 6/2014 |
| TW | M502172 U | 6/2015 |
| WO | 2016/146276 A1 | 9/2016 |

OTHER PUBLICATIONS

International Search Report issued in corresponding International Patent Applicatin No. PCT/JP2017/040736, dated Dec. 19, 2017, with English Translation.
Taiwanese Office Action issued in corresponding Taiwanese Patent Application No. 106143369, dated Oct. 5, 2018.
Japanese Notice of Allowance issued in corresponding Japanese Patent Application No. 2017-047284, dated Feb. 25, 2020, with English translation.
Japanese Office Action issued in corresponding Japanese Patent Application No. 2017-047284, dated Sep. 3, 2019.

* cited by examiner

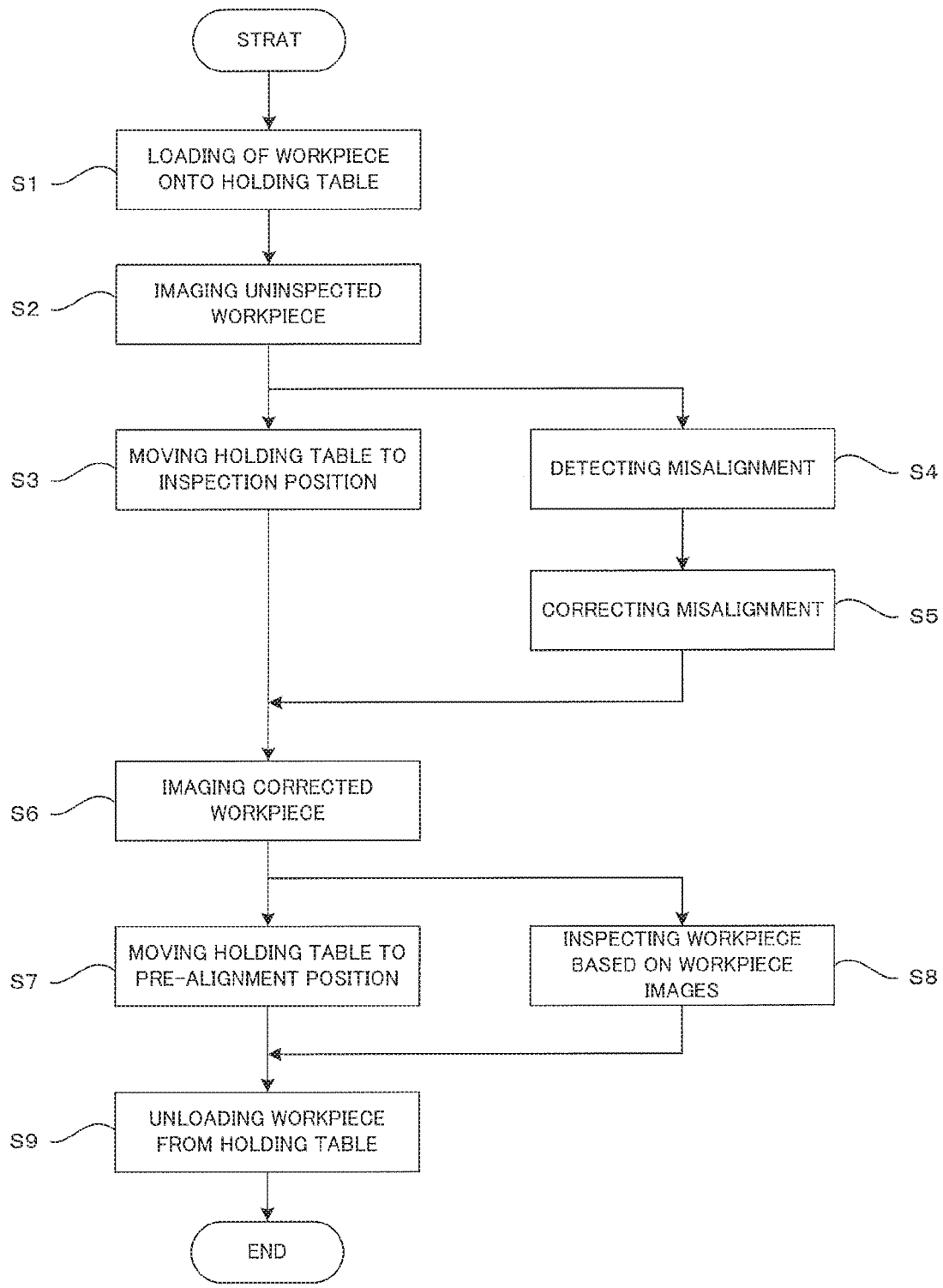

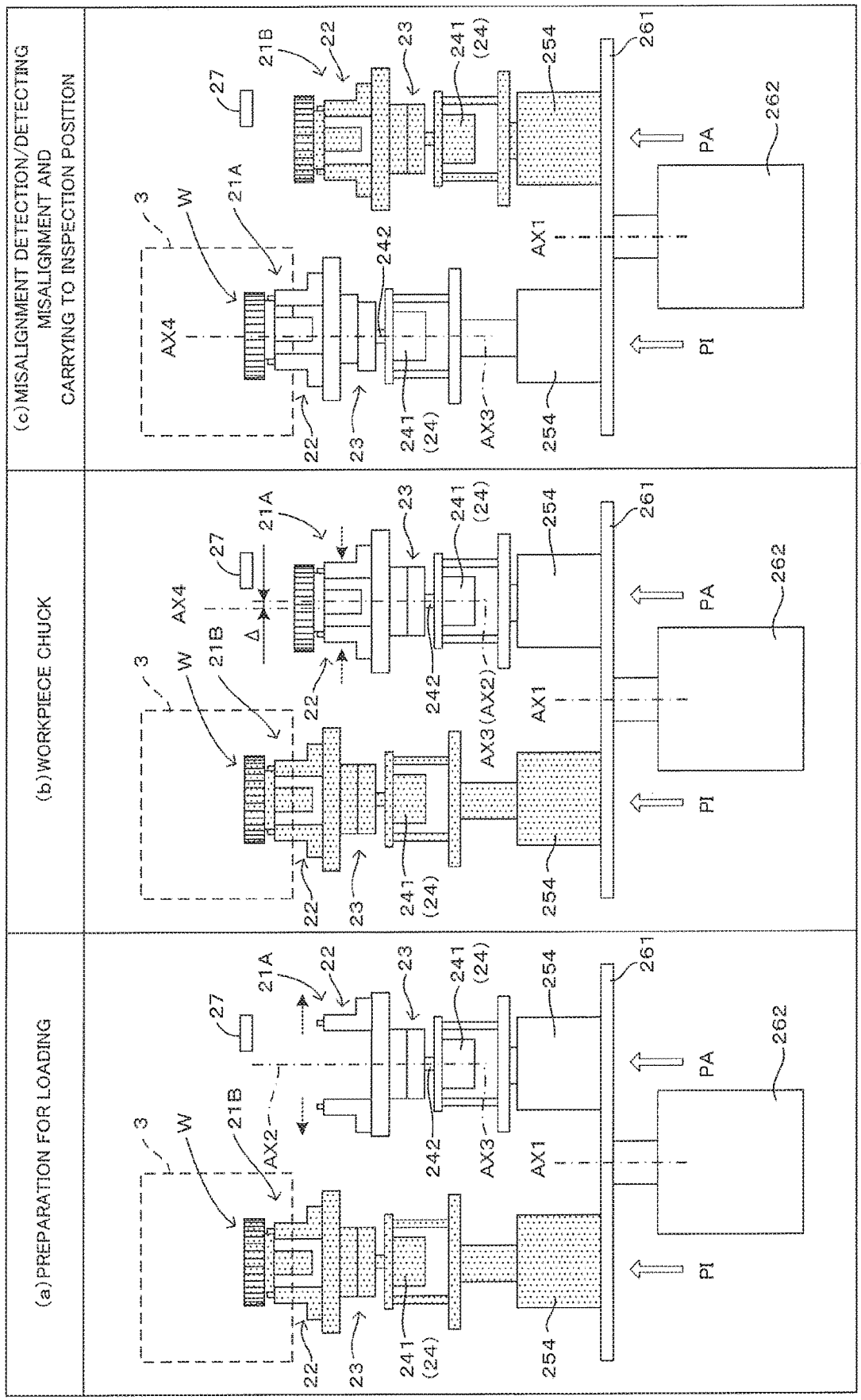

INSPECTION APPARATUS AND INSPECTION METHOD

CROSS REFERENCE

This application is the U.S. National Phase under 35 U.S.C. § 371 of International Application No. PCT/JP2017/040736, filed on Nov. 13, 2017, which claims the benefit of Japanese Application No. 2017-047284, filed on Mar. 13, 2017, the entire contents of each are hereby incorporated by reference.

TECHNICAL FIELD

The present invention relates to an inspection apparatus and an inspection method for inspecting a workpiece having an outer periphery of a rotationally symmetric shape about a symmetry axis with projections and recesses provided periodically and repeatedly.

BACKGROUND

A workpiece inspection apparatus described in patent literature 1 is known as an example of an apparatus for inspection of the appearance of a workpiece rotationally symmetric about a symmetry axis. In the workpiece inspection apparatus, the workpiece is held by a holder unit connected to a motor. While the workpiece is rotated by the motor, multiple cameras capture images of the workpiece and the appearance of the workpiece are inspected on the basis of the captured images.

CITATION LIST

Patent Literature

[Patent Literature 1] JP 2012-63268 A

SUMMARY OF INVENTION

Technical Problem

The apparatus described in patent literature 1 is to inspect a gear as a workpiece for the presence of scratches, defects, etc. at the gear. This apparatus includes three imaging cameras: a tooth surface imaging camera for imaging of a tooth surface from outside when viewed in a radial direction of the workpiece; a tooth tip imaging camera for imaging of a tooth tip from outside when viewed in the radial direction of the workpiece; and an end surface imaging camera for imaging of the tooth tip from vertically above the workpiece. The tooth surface imaging camera of these cameras is what is called an area camera, and the camera is installed and camera settings are made (selection of a lens, magnification, etc.) so as to capture an image containing at least two or more tooth sections.

A tooth section of a gear includes two tooth surfaces formed in a rotary direction of the gear. One of the tooth surfaces is a tooth surface extending from an edge of an addendum (tooth tip) toward an upstream tooth root when viewed in the rotary direction (hereinafter called an "upstream tooth surface"). The other is a tooth surface extending from the edge of the tooth tip toward a downstream tooth root when viewed in the rotary direction (hereafter called a "downstream tooth surface"). In the foregoing apparatus described in patent literature 1, a subject of one-time imaging by the tooth surface imaging camera includes not only the addendum and a dedendum but it also the upstream tooth surface and the downstream tooth surface. An image acquired by this imaging shows an entire surface of the tooth section. In some cases, this makes it difficult to acquire information required for detailed inspection of the upstream tooth surface or the downstream tooth surface. Further, imaging of the upstream tooth surface and the downstream tooth surface is difficult in some shapes or in some types of gears. Such problems also occur if the apparatus described in patent literature 1 is used for inspecting a workpiece having similar features to a gear, more specifically, a workpiece having an outer peripheral portion of a rotationally symmetric shape about a symmetry axis with projections and recesses provided periodically and repeatedly.

The present invention has been made in view of the foregoing problems, and is intended to provide an inspection technique allowing high-accuracy inspection of a workpiece having an outer peripheral portion rotationally symmetric about a symmetry axis with projections and recesses provided periodically and repeatedly.

One aspect of the present invention is an inspection apparatus that inspects a workpiece having an outer peripheral portion of a rotationally symmetric shape about a symmetry axis with projections and recesses provided periodically and repeatedly. The apparatus comprises: a holding table that rotates the workpiece about a rotary axis while holding the workpiece with the symmetry axis matched with the rotary axis; an edge imaging mechanism that captures an image of an edge portion of a projection of the rotated workpiece; an upstream imaging mechanism that captures an image of an upstream wall surface extending to the edge of the projection from the bottom of a recess adjacent to an upstream side of the projection in a rotary direction of the workpiece; a downstream imaging mechanism that captures an image of a downstream wall surface extending to the edge of the projection from the bottom of a recess adjacent to a downstream side of the projection in the rotary direction; and an inspector that inspects the workpiece on the basis of the images captured by the edge imaging mechanism, the upstream imaging mechanism, and the downstream imaging mechanism.

Other aspect of the present invention is an inspection method of inspecting a workpiece having an outer peripheral portion of a rotationally symmetric shape about a symmetry axis with projections and recesses provided periodically and repeatedly. The method comprises: a step of causing an edge imaging mechanism to capture an image of an edge portion of a projection of the workpiece to acquire an edge image, causing an upstream imaging mechanism to capture an image of an upstream wall surface extending to the edge of the projection from the bottom of a recess adjacent to an upstream side of the projection in a rotary direction of the workpiece to acquire an upstream wall surface image, and causing a downstream imaging mechanism to capture an image of a downstream wall surface extending to the edge of the projection from the bottom of a recess adjacent to a downstream side of the projection in the rotary direction to acquire a downstream wall surface image, while holding the workpiece and rotating the workpiece about a rotary axis with the symmetry axis matched with the rotary axis; and a step of inspecting the workpiece on the basis of the edge image, the upstream wall surface image, and the downstream wall surface image.

In the invention having the foregoing configuration, the dedicated edge imaging mechanism, upstream imaging mechanism, and downstream imaging mechanism are provided for imaging of the edge portion of the projection of the workpiece, imaging of the upstream wall surface of the workpiece, and imaging of the downstream wall surface of the workpiece respectively to acquire the edge image, the upstream wall surface image, and the downstream wall surface image separately. The workpiece is inspected on the basis of the acquired images.

Advantageous Effect of Invention

As described above, according to the present invention, the workpiece is inspected on the basis of the images acquired by imaging of the edge portion of the projection of the workpiece, the upstream wall surface of the workpiece, and the downstream wall surface of the workpiece using the edge imaging mechanism, the upstream imaging mechanism, and the downstream imaging mechanism respectively. This achieves high-accuracy inspection of various types of workpieces.

All of a plurality of constituent elements of each aspect of the invention described above are not essential and some of the plurality of constituent elements can be appropriately changed, deleted, replaced by other new constituent elements or have limited contents partially deleted in order to solve some or all of the aforementioned problems or to achieve some or all of effects described in this specification. Further, some or all of technical features included in one aspect of the invention described above can be combined with some or all of technical features included in another aspect of the invention described above to obtain one independent form of the invention in order to solve some or all of the aforementioned problems or to achieve some or all of the effects described in this specification.

BRIEF DESCRIPTION OF DRAWINGS

FIG. 8 is a flowchart showing the operation of inspecting a workpiece by the inspection apparatus in FIG. 1.

FIG. 9 schematically shows the inspecting operation.

DESCRIPTION OF EMBODIMENT

Figure 1:
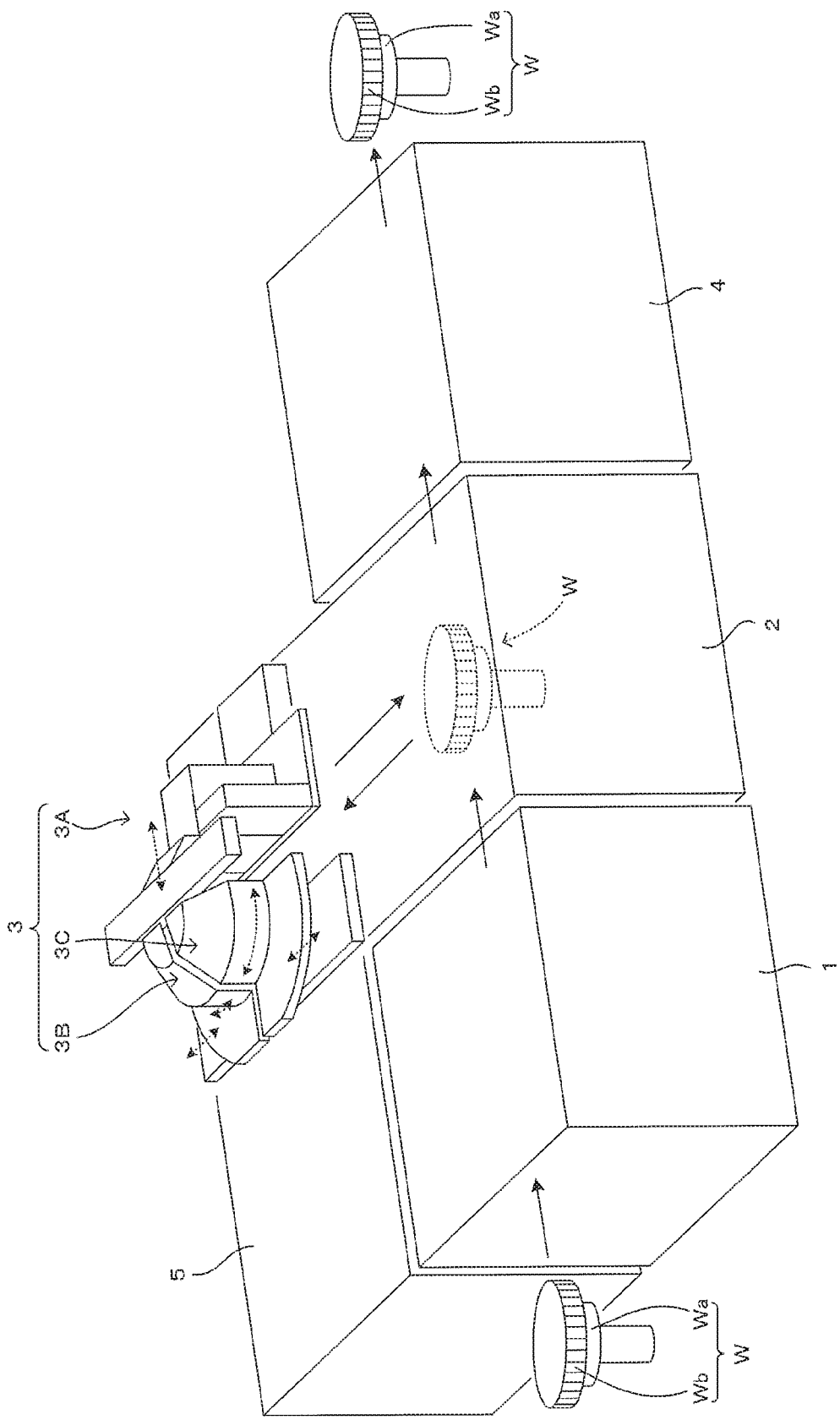
FIG. 1 shows the entire configuration of a first embodiment of an inspection apparatus according to the present invention.
Figure 2:
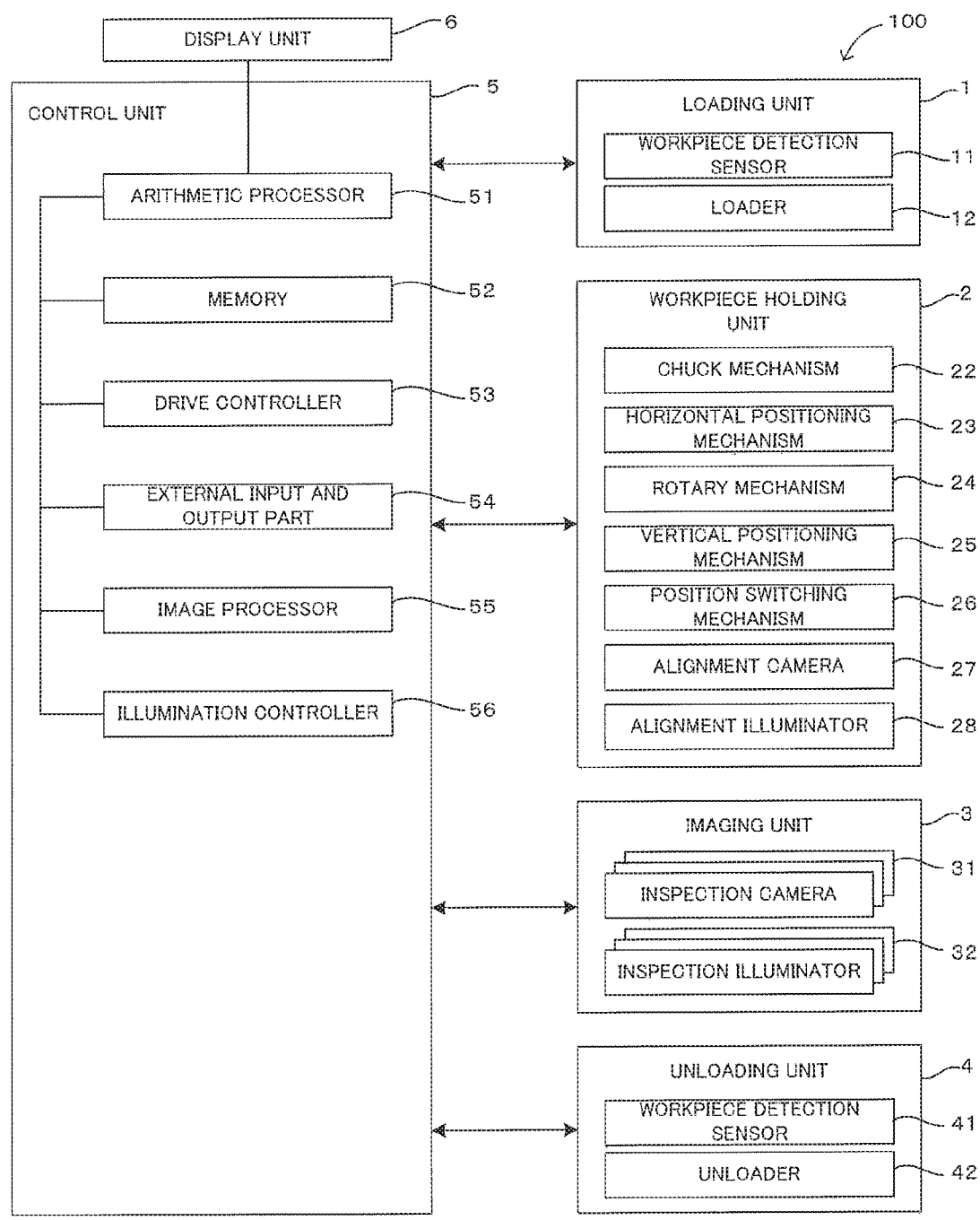
FIG. 2 is a block diagram showing the electrical configuration of the inspection apparatus shown in FIG. 1.

FIG. 1 shows the entire configuration of a first embodiment of an inspection apparatus according to the present invention. FIG. 2 is a block diagram showing the electrical configuration of the inspection apparatus shown in FIG. 1. The inspection apparatus 100 is to inspect the appearance of a workpiece W such as a gear or an impeller having an outer peripheral portion of a rotationally symmetric shape about a symmetry axis with projections and recesses provided periodically and repeatedly. The inspection apparatus 100 includes a loading unit 1, a workpiece holding unit 2, an imaging unit 3, an unloading unit 4, and a control unit 5. As shown in FIG. 1, the workpiece W mentioned herein is a machine part with a shaft Wa and a gear Wb provided at the top of the shaft Wa and is formed by forging or casting, for example. After the part is manufactured, the workpiece W is carried to the loading unit 1 by an external transfer robot or an operator.

The loading unit 1 includes a workpiece housing (not shown in the drawings) such as a table or a storage locker. When a workpiece W is temporarily housed into the workpiece housing by the external transfer robot, for example, a workpiece detection sensor 11 (FIG. 2) at the workpiece housing detects the workpiece W, and transmits a signal indicating the detection to the control unit 5 responsible for control of the apparatus entirely. The loading unit 1 includes a loader 12 (FIG. 2). In response to an operation command from the control unit 5, the loading unit 1 receives an uninspected workpiece W in the workpiece housing and carries the uninspected workpiece W to the workpiece holding unit 2.

Figure 3:
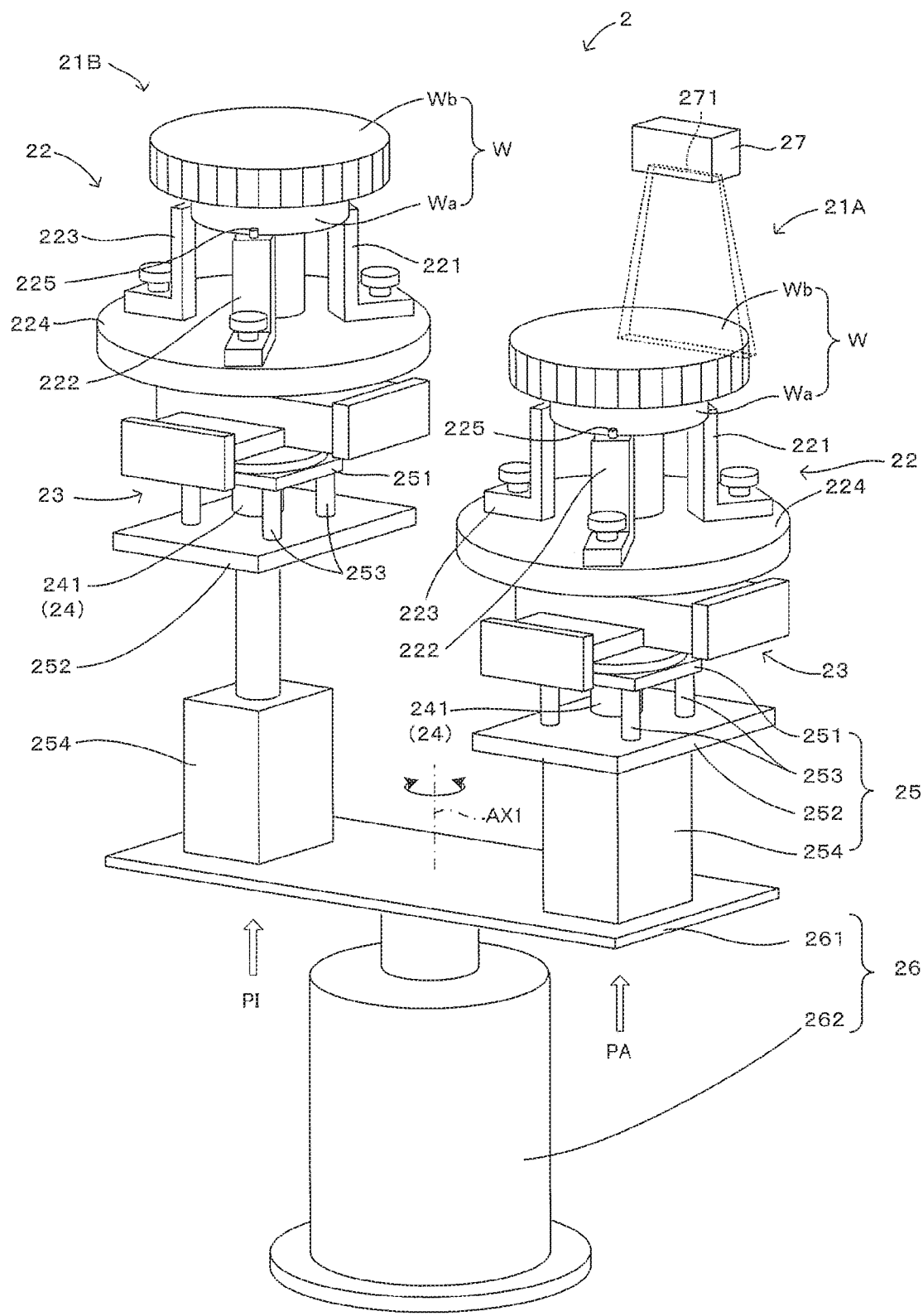
FIG. 3 is a perspective view showing the configuration of the workpiece holding unit.

FIG. 3 is a perspective view showing the configuration of the workpiece holding unit. The workpiece holding unit 2 is equipped with a holding table 21A and a holding table 21B for holding the workpiece W carried by the loader 12. The holding tables 21A and 21B have the same configuration and can hold the workpiece W by grasping a part of the shaft Wa of the workpiece W in a posture in which the gear Wb is in a horizontal position. The configuration of the holding table 21A will be described below by referring to FIG. 3. Meanwhile, as the holding table 21B has the same configuration as the holding table 21A, the holding table 21B will be given the same signs as the holding table 21A and will not be described.

As shown in FIG. 3, the holding table 21A includes a chuck mechanism 22, a horizontal positioning mechanism 23, a rotary mechanism 24, and a vertical positioning mechanism 25 stacked in the vertical direction. The chuck mechanism 22 includes movable members 221 to 223 substantially L-shaped in a side view, and a moving part 224 that moves the movable members 221 to 223 in conjunction with each other in a radial pattern in response to a movement command from the control unit 5. Each of the movable members 221 to 223 has an upper end surface where a projection member 225 is provided, and can be engaged with a stepped part of the shaft Wa using the upper end surface and the projection member 225. Thus, by moving the movable members 221 to 223 to get closer to each other using the moving part 224 in response to a grasp command from the control unit 5, it becomes possible to hold a workpiece W with the center axis of the chuck mechanism 22 (sign AX2 in FIG. 9) and the axis of the shaft Wa matched with each other. Meanwhile, by moving the movable members 221 to 223 to get away from each other using the moving part 224 in response to a release command from the control unit 5, it becomes possible to load an uninspected workpiece W using the loading unit 1 or unload an inspected workpiece W using the unloading unit 4.

The chuck mechanism 22 having the foregoing configuration is supported by the horizontal positioning mechanism 23. The horizontal positioning mechanism 23 includes what is called as an XY table for movements in directions orthogonal to each other in the horizontal direction. Thus, driving the XY table in response to a movement command from the control unit 5 allows high-accuracy positioning of the chuck mechanism 22 on a horizontal plane. Note that, as the XY table, a member using a motor and a ball screw mechanism in combination or a member using two linear motors in combination orthogonal to each other in the horizontal direction is applicable, for example.

The rotary mechanism 24 includes a motor 241. A rotary shaft (sign 242 in FIG. 9) of the motor 241 extends vertically upwardly. The horizontal positioning mechanism 23 is connected to the upper end of the rotary shaft. Thus, when a rotation command is given from the control unit 5, the motor 241 is actuated to rotate the horizontal positioning mechanism 23, the chuck mechanism 22, and a workpiece W grasped by the chuck mechanism 22 integrally about the rotary axis (sign AX3 in FIG. 9) of the motor 241.

In the embodiment, the horizontal positioning mechanism 23 is provided between the chuck mechanism 22 and the rotary mechanism 24, and this has a technical significance of making the respective positions of the axis of the chuck mechanism 22, the symmetry axis (sign AX4 in FIG. 9) of the gear Wb of the workpiece W grasped by the chuck mechanism 22, and the rotary axis of the motor 241 relative to each other adjustable using the horizontal positioning mechanism 23. More specifically, matching the center axis of the chuck mechanism 22 and the rotary axis of the motor 241 with each other allows the workpiece W grasped by the chuck mechanism 22 to rotate about the shaft Wa. In the presence of displacement of the symmetry axis of the gear Wb from the shaft Wa, however, misalignment thereof with respect to the motor 241 occurs to cause unintentional eccentric rotation of the gear Wb. In response to this, the horizontal positioning mechanism 23 is provided to achieve drive so as to correct the amount of the displacement and a direction of the displacement. By doing so, the symmetry axis of the gear Wb and the rotary axis of the motor 241 can be matched with each other. This allows capturing of an image of the gear Wb with high accuracy by the imaging unit 3. As a result, the workpiece W can be inspected with higher accuracy.

The vertical positioning mechanism 25 includes a holding plate 251 holding the motor 241, a base plate 252 arranged below the motor 241, four connecting pins 253 connecting the holding plate 251 and the base plate 252, and an elevator 254 for moving the base plate 252 up and down in the vertical direction. The elevator 254 moves the base plate 252 up and down in response to an up-down command from the control unit 5 to move the rotary mechanism 24, the horizontal positioning mechanism 23, and the chuck mechanism 22 integrally in the vertical direction. By doing so, a workpiece W can be located at an appropriate height position at a pre-alignment position PA and an inspection position PI described next.

As shown in FIG. 3, the holding tables 21A and 21B having the foregoing configuration are fixed on a support plate 261 while being separated by a certain distance. The support plate 261 is supported by a turning driver 262 at an intermediate position between the holding tables 21A and 21B. The turning driver 262 can make the support plate 261 turn 180 degrees about a turning axis AX1 extending in the vertical direction in response to a turning command from the control unit 5. As shown in FIG. 3, the turning driver 262 can make a switch between a first position at which the holding tables 21A and 21B are located at the pre-alignment position PA and the inspection position PI respectively, and a second position at which the holding tables 21A and 21B are located at the inspection position PI and the pre-alignment position PA respectively. For example, in parallel with pre-alignment process on a workpiece W held by the holding table 21A at the pre-alignment position PA, the turning driver 262 makes a switch from the first position to the second position to shift the holding table 21A from the pre-alignment position PA to the inspection position PI. By doing so, the workpiece W after being subjected to the pre-alignment process can be located at the inspection position PI. After inspection of this workpiece W is finished, a turn is made in the opposite direction to shift the holding table 21A from the inspection position PI to the pre-alignment position PA. By doing so, the workpiece W after being subjected to the inspection process can be located at the pre-alignment position PA. In this way, in the embodiment, the support plate 261 and the turning driver 262 form a position switching mechanism 26 for switching the position of the workpiece W.

As described above, the pre-alignment position PA is a position for the pre-alignment process. An alignment camera 27 is arranged above the holding table 21A (or 21B) located at the pre-alignment position PA. As shown in FIG. 3, the alignment camera 27 is arranged on the opposite side of the motor 241 with respect to a workpiece W, namely, above the workpiece W. The alignment camera 27 includes a line sensor 271 extending radially outwardly from the symmetry axis AX4 of the workpiece W. This allows imaging of the upper surface of the workpiece W by the line sensor 271 while rotating the workpiece W. By rotating the workpiece W at least one turn, an image covering all the projections (teeth tips) and the recesses (teeth roots) at the outer peripheral portion of the gear Wb is acquired.

While not shown in FIG. 3, an alignment illuminator 28 (FIG. 2) is provided that illuminates a workpiece W held by the holding table 21A (or 21B) for performing the alignment process favorably. Thus, during capturing of an image of the workpiece W by the alignment camera 27, the workpiece W can be illuminated by the alignment illuminator 28 while the workpiece W is rotated by the rotary mechanism 24. Data about the image of the workpiece W is transmitted to the control unit 5 so that the misalignment is corrected to match the symmetry axis of the gear Wb and the rotary axis of the motor 241 with each other, that is, a pre-alignment process is performed.

The inspection position PI is a position at which the inspection process is performed. The imaging unit 3 is arranged above the holding table 21A (or 21B) located at the inspection position PI. At the inspection position PI, an image of a workpiece W can be captured by the imaging unit 3 while the workpiece W is rotated with the symmetry axis of the gear Wb and the rotary axis of the motor 241 matched with each other. Data about the image of the workpiece W is transmitted to the control unit 5 to perform the inspection process of inspecting the workpiece W for the presence or absence of scratches, defects, etc. at the gear Wb.

As shown in FIG. 2, the imaging unit 3 includes multiple inspection cameras 31 and multiple inspection illuminators 32. The inspection illuminators 32 of the imaging unit 3 are arranged so as to illuminate a workpiece W from various directions held by the holding table 21A (or 21B) located at the inspection position PI. Images of the workpiece W can be captured from various directions by the inspection cameras 31 while the workpiece W is rotated by the rotary mechanism 24 and the workpiece W is illuminated by the inspection illuminators 32. Multiple pieces of data about the captured images are transmitted to the control unit 5 and the workpiece W is inspected by the control unit 5.

The holding table 21A (or 21B) holding the inspected workpiece W is shifted from the inspection position PI to the pre-alignment position PA by the position switching mechanism 26 as described above. Then, the inspected workpiece W is carried out of the holding table 21A (or 21B) by the unloading unit 4. The unloading unit 4 is basically the same as the loading unit 1. More specifically, the unloading unit 4 includes a workpiece housing (not shown in the drawings) for temporarily housing an inspected workpiece W, a workpiece detection sensor 41 (FIG. 2), and an unloader 42 (FIG. 2). In response to an operation command from the control unit 5, the unloading unit 4 carries the inspected workpiece W from the holding table 21A (21B) to the workpiece housing.

As shown in FIG. 2, the control unit 5 is composed of a well-known central processing unit (CPU) for implementation of logic operations, a read only memory (ROM) storing initial setting and others, a random access memory (RAM) for temporarily storing various types of data generated during operation of the apparatus, etc. The control unit 5 functionally includes an arithmetic processor 51, a memory 52, a drive controller 53, an external input and output part 54, an image processor 55, and an illumination controller 56.

The drive controller 53 controls drive of driven mechanisms such as the loader 12 and the chuck mechanism 22 provided at corresponding positions of the apparatus. The external input and output part 54 inputs signals from various types of sensors installed on corresponding positions of the apparatus, and outputs signals to various types of actuators, etc. installed on corresponding positions of the apparatus. The image processor 55 retrieves image data from the alignment camera 27 and the inspection camera 31 and performs image processing such as binarization. The illumination controller 56 controls turning-on, turning-off, etc. of the alignment illuminator 28 and the inspection illuminator 32.

The arithmetic processor 51 has an arithmetic function, and performs a sequence of processes described next by controlling the drive controller 53, the image processor 55, and the illumination controller 56 in accordance with a program stored in the memory 52.

A sign 6 shown in FIG. 2 means a display unit functioning as an interface with an operator. The display unit 6 is connected to the control unit 5 to fulfill the function of displaying an operating state of the inspection apparatus 100. Additionally, the display unit 6 is configured using a touch panel to fulfill a function as an input terminal to accept input from an operator. The display unit 6 is not limited to this configuration but can be configured using a display device for display of an operating state and input terminals such as a keyboard and a mouse.

Figure 4:
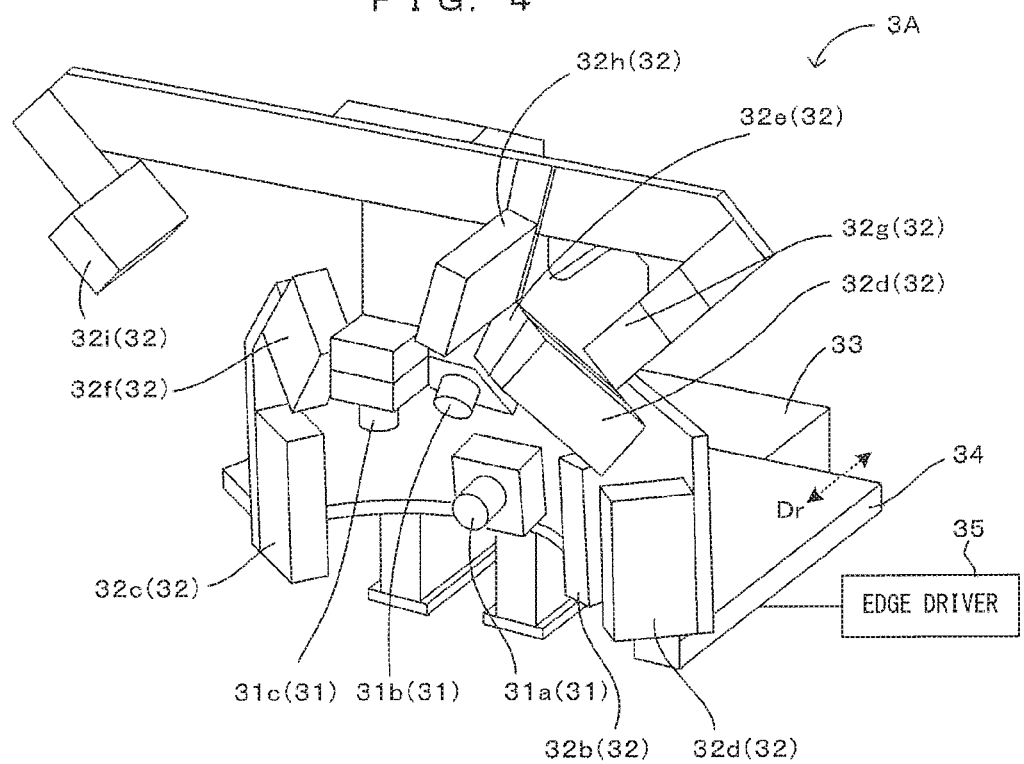
FIG. 4 shows the configuration of an edge imaging mechanism of the imaging unit.
Figure 5:
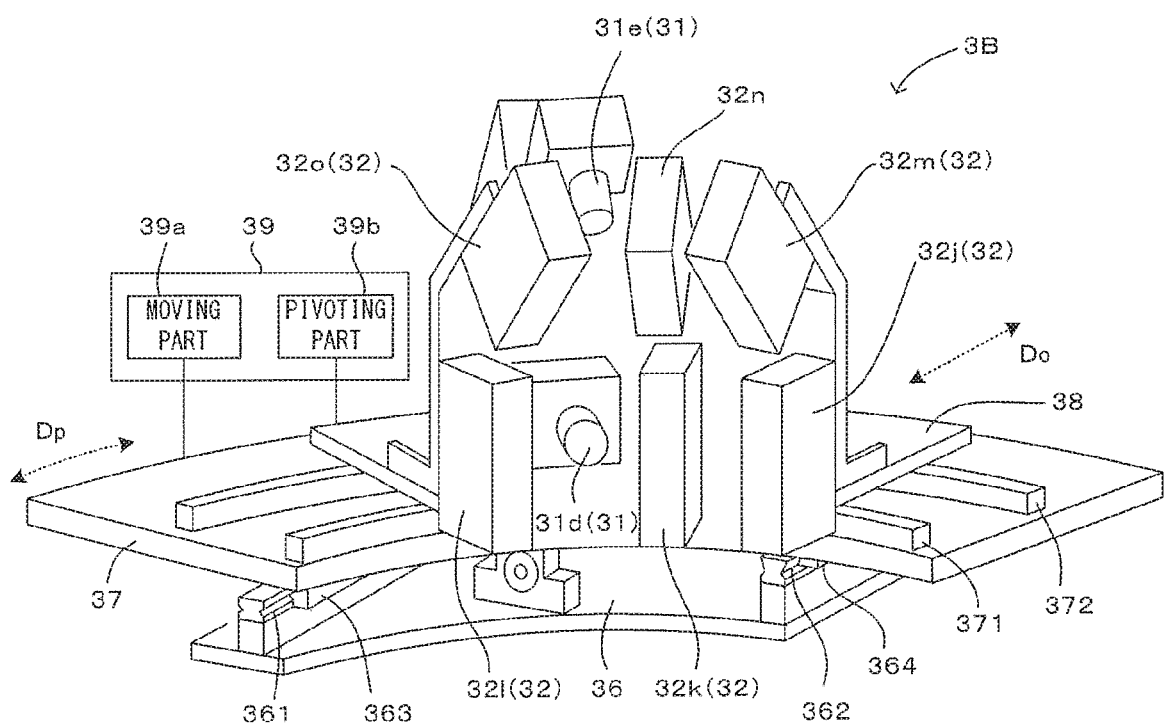
FIG. 5 shows the configuration of an upstream imaging mechanism of the imaging unit.
Figure 6:
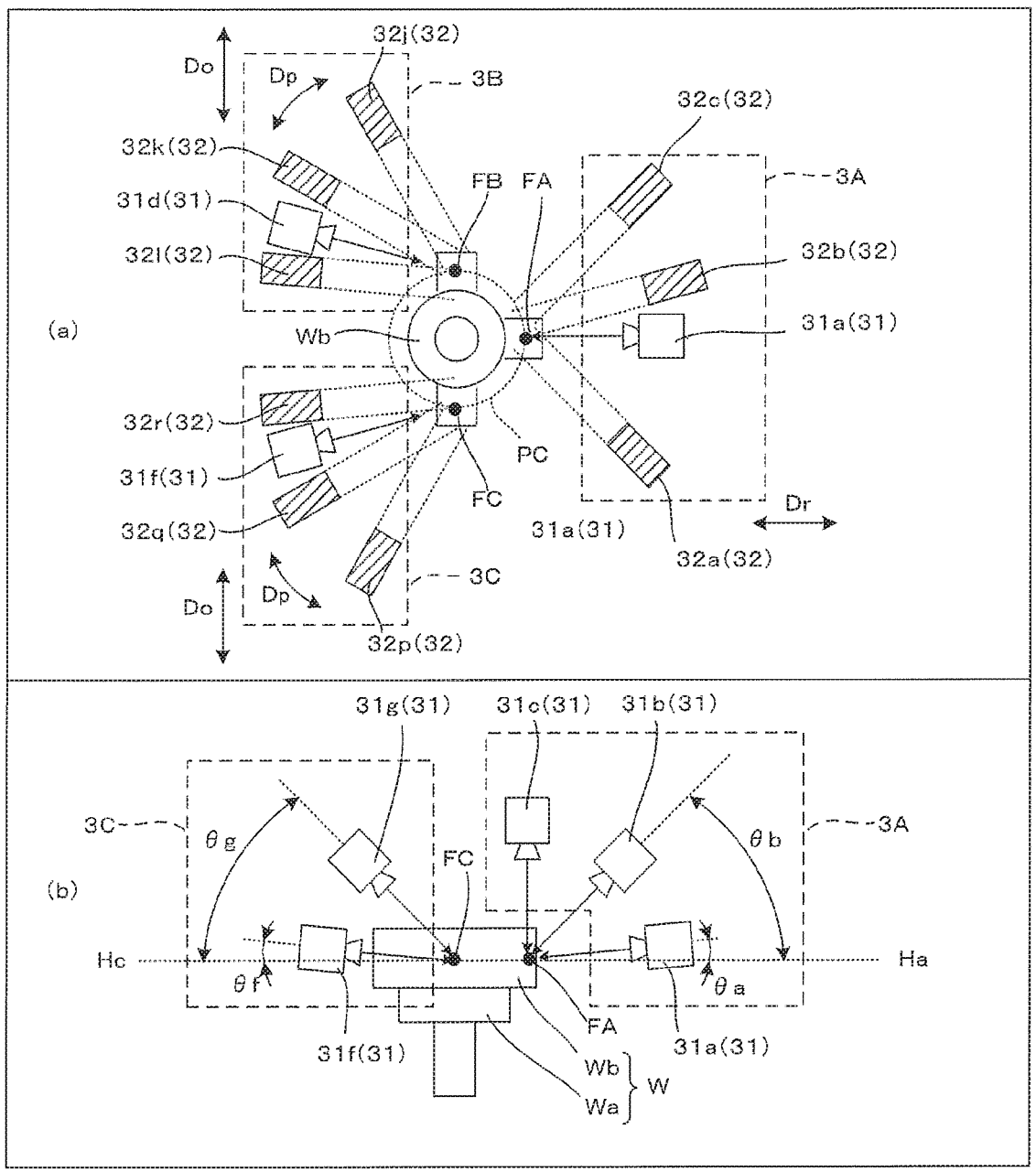
FIG. 6 schematically shows locations of inspection cameras and inspection illuminators relative to a gear.
Figure 7:
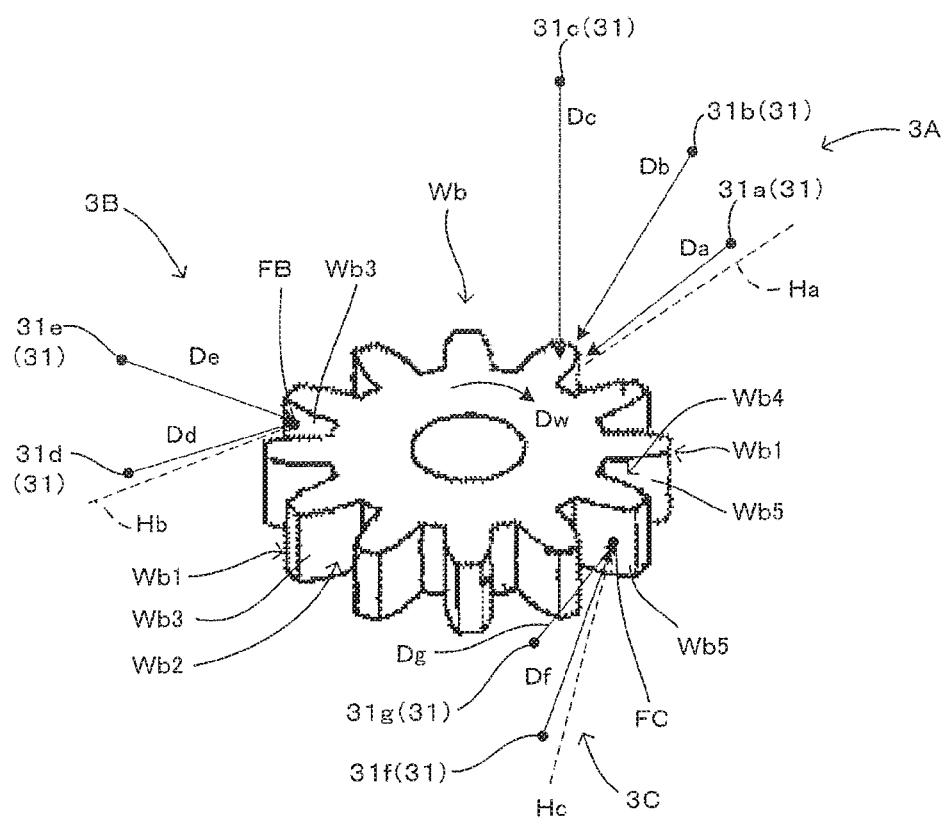
FIG. 7 shows directions of imaging of the gear by the inspection cameras.

The configuration and operation of the imaging unit 3 will be described next by referring to FIGS. 1 and 4 to 7. FIG. 4 shows the configuration of an edge imaging mechanism of the imaging unit. FIG. 5 shows the configuration of an upstream imaging mechanism of the imaging unit. FIG. 6 schematically shows locations of inspection cameras and inspection illuminators relative to a gear. FIG. 7 shows directions of imaging of the gear by the inspection cameras. As shown in FIG. 1, the imaging unit 3 includes an edge imaging mechanism 3A, an upstream imaging mechanism 3B, and a downstream imaging mechanism 3C, and is capable of capturing an image of each part of the gear Wb of the workpiece W while the workpiece W is held by the holding table 21A (or 21B) and is rotated in a predetermined rotary direction Dw.

The edge imaging mechanism 3A illuminates a predetermined illumination region in spots from a plurality of directions using nine inspection illuminators 32. Further, the edge imaging mechanism 3A captures images of an edge portion of the tooth section located in the illumination area out of the gear Wb of the workpiece W located in the illumination area, that is, the addendum Wb1 (see FIG. 7) from a plurality of directions using three inspection cameras 31, and transmits image data about the images of the addendum Wb1 (hereinafter called "edge images") to the control unit 5. More specifically, as shown in FIG. 4, in the edge imaging mechanism 3A, a base part 33 is fixedly arranged at a body part (not shown in the drawings) of the imaging unit 3, and a support plate 34 is provided so as to be movable relative to the base part 33 in a movement direction Dr parallel to a radial direction of the gear Wb. More specifically, the base part 33 includes two guide rails (not shown in the drawings) extending in the movement direction Dr, and sliders (not shown in the drawings) attached to the guide rails so as to be movable in the movement direction Dr. The support plate 34 is fixed to the sliders from above. An edge driver 35 is connected to the support plate 34. The edge driver 35 has the function of determining the position of the support plate 34 by moving the support plate 34 in the movement direction Dr relative to the base part 33. Thus, when the edge driver 35 moves the support plate 34 in the movement direction Dr in response to a command from the control unit 5, the inspection cameras 31 and the inspection illuminators 32 attached to the support plate 34 via brackets, attachment arms, etc. move integrally in the movement direction Dr, as will be described next. In this way, illumination positions and imaging positions in the edge imaging mechanism 3A can be adjusted in response to the type of the workpiece W.

In the edge imaging mechanism 3A, the three inspection cameras 31 are arranged at different positions in the axis direction of the rotary axis (sign AX3 in FIG. 9) of the rotary mechanism 24 for imaging of the addendum Wb1 of the gear Wb from a plurality of directions and from the outside in the radial direction of the workpiece W. Hence, imaging directions Da to Dc are different from each other as shown in FIG. 7. In the following, to describe the inspection cameras 31 in the edge imaging mechanism 3A distinctively, an inspection camera 31 corresponding to the imaging direction Da tilted from a horizontal direction Ha by an angle θa (5°, for example) will be called an "inspection camera 31a," an inspection camera 31 corresponding to the imaging direction tilted from the horizontal direction Ha by an angle θb (45°, for example) will be called an "inspection camera 31b," and an inspection camera 31 corresponding to the imaging direction substantially orthogonal to the horizontal direction Ha will be called an "inspection camera 31c" where appropriate, as shown in FIGS. 6 and 7.

As described above, the imaging directions Da to Dc differing from each other are set for the inspection cameras 31a to 31c. Meanwhile, focal positions FA of the inspection cameras 31a to 31c coincide with each other. Furthermore, the inspection cameras 31a to 31c are located in the movement direction Dr by the edge driver 35 so as to dispose the focal positions FA on a pitch circle PC of the gear Wb. This allows high-accuracy imaging of the addendum Wb1 of the gear Wb from the lateral, oblique and upper three directions.

In this embodiment, for imaging of the addendum Wb1 at the foregoing focal position FA from outside in the radial direction, the addendum Wb1 of the gear Wb is illuminated from outside in the radial direction and from a plurality of directions. More specifically, the inspection illuminators 32 are divided into three groups (a lateral illumination group, an oblique illumination group, and a higher illumination group). Further, the inspection illuminators 32 in each group are spaced at a predetermined angular interval in the rotary direction Dw. In the following, to describe the inspection illuminators 32 in the edge imaging mechanism 3A distinctively, three inspection illuminators 32 belonging to the lateral illumination group will be called an "inspection illuminator 32a," an "inspection illuminator 32b", and "an inspection illuminator 32c," where appropriate. Three inspection illuminators 32 belonging to the oblique illumination group will be called an "inspection illuminator 32d," an "inspection illuminator 32e", and "an inspection illuminator 32f," where appropriate. Further, three inspection illuminators 32 belonging to the higher illumination group will be called an "inspection illuminator 32g," an "inspection illuminator 32h", and "an inspection illuminator 32i," where appropriate.

The inspection illuminators 32a to 32i are configured to be turned on and off independently by the illumination controller 56 of the control unit 5. As shown in the upper section of FIG. 6, each of the inspection illuminators 32a to 32i illuminates the vicinity of the focal position FA of the inspection cameras 31a to 31c in spots. In this embodiment, all the inspection illuminators 32a to 32i emit illumination lights to the gear Wb along axes deviating from the optical axes of the inspection cameras 31a to 31c. Meanwhile, the inspection illuminators 32a to 32i may be configured in such a manner that some of the illumination lights are emitted to the gear Wb along the same axes as the optical axis of the inspection camera 31a, 31b, or 31c. This also applies to the upstream imaging mechanism 3B and the downstream imaging mechanism 3C described next.

The upstream imaging mechanism 3B is configured to capture an image of an upstream wall surface, namely, an upstream tooth surface Wb3 (see FIG. 7) extending to an edge of the addendum Wb1 (tooth tip) from the bottom of a dedendum Wb2 (see FIG. 7) adjacent to the upstream side of the addendum Wb1 in the rotary direction Dw. Further, the downstream imaging mechanism 3C is configured to capture an image of a downstream wall surface, namely, a downstream tooth surface Wb5 (see FIG. 7) extending to an edge of the addendum Wb1 (tooth tip) from the bottom of a dedendum Wb4 (see FIG. 7) adjacent to downstream side of the addendum Wb1 in the rotary direction Dw. While the upstream imaging mechanism 3B and the downstream imaging mechanism 3C are for imaging of different subjects, the upstream imaging mechanism 3B and the downstream imaging mechanism 3C have the same basic configuration. Thus, in the following, while the configuration and operation of the upstream imaging mechanism 3B will be described in detail by referring to drawings, the downstream imaging mechanism 3C will be given the same signs or corresponding signs and description of the configuration thereof will be omitted.

As shown in FIG. 6, the upstream imaging mechanism 3B is arranged on the opposite side of the edge imaging mechanism 3A across the workpiece W. As shown in FIG. 5, in the upstream imaging mechanism 3B, six inspection illuminators 32 and two inspection cameras 31 are provided. The inspection illuminators 32 illuminate a predetermined illumination region in spots from a plurality of directions. The two inspection cameras 31 capture images of the upstream tooth surface Wb3 (see FIG. 7) of a tooth section belonging to the tooth section of the gear Wb of the workpiece W and located in the foregoing illumination region from a plurality of directions, and transmit image data about the images of the upstream tooth surface Wb3 (hereinafter called "upstream tooth surface images") to the control unit 5.

More specifically, as shown in FIG. 5, in the upstream imaging mechanism 3B, a base part 36 is fixedly arranged at the body part (not shown in the drawings) of the imaging unit 3. A movable plate 37 is provided so as to be movable relative to the base part 36 in an orthogonal direction Do orthogonal to the movement direction Dr in which the inspection cameras 31a to 31c and the inspection illuminators 32a to 32i in the edge imaging mechanism 3A are to move. As shown in FIG. 5, the movable plate 37 is finished into a sector-like shape in a plan view and has a curved shape with a focal position FB described later defined as a center of curvature. A support plate 38 is provided so as to be capable of pivoting relative to the movable plate 37 in a pivotal direction Dp about the focal position FB as a pivotal center. More specifically, in the base part 36, two guide rails 361 and 362 extend in the orthogonal direction Do and a slider 363 and a slider 364 are attached to the guide rails 361 and 362 respectively so as to be movable in the orthogonal direction Do. The movable plate 37 is fixed to the sliders 363 and 364 from above. A guide rail 371 and a guide rail 372, each having a curved shape with the focal position FB defined as a center of curvature, are provided on the movable plate 37. Sliders (not shown in the drawings) are attached to the guide rails 371 and 372 so as to be movable along the guide rails 371 and 372. The support plate 38 is fixed to the sliders from above. In this way, the support plate 38 becomes movable in the orthogonal direction Do and becomes capable of pivoting about the focal position FB as a pivotal center.

The upstream imaging mechanism 3B includes an upstream driver 39 having a moving part 39a and a pivoting part 39b. The moving part 39a moves the movable plate 37 in the orthogonal direction Do relative to the base part 36. The pivoting part 39b pivots the support plate 38 about the focal position FB relative to the movable plate 37. Thus, when the upstream driver 39 moves the support plate 38 in the orthogonal direction Do and causes the support plate 38 to pivot about the focal position FB as a pivotal center in response to a command from the control unit 5, the inspection cameras 31 and the inspection illuminators 32 attached to the support plate 38 via brackets, attachment arms, etc. are integrally located at their positions determined in the orthogonal direction Do and the pivotal direction Dp. In this way, illumination positions and imaging positions in the upstream imaging mechanism 3B can be adjusted in response to the type of the workpiece W.

As shown in FIG. 6, in the upstream imaging mechanism 3B, the two inspection cameras 31 are arranged at different positions in the axis direction of the rotary axis (sign AX3 in FIG. 9) of the rotary mechanism 24 for imaging of the upstream tooth surface Wb3 of the gear Wb from a plurality of directions and from outside in tangential direction with respect to the pitch circle PC. Thus, an imaging direction Dd and an imaging direction De are different from each other. In the following, to describe the inspection cameras 31 in the upstream imaging mechanism 3B distinctively, an inspection camera 31 corresponding to the imaging direction Dd tilted from a horizontal direction Hb by an angle (5°, for example) will be called an "inspection camera 31d," and an inspection camera 31 corresponding to the imaging direction tilted from the horizontal direction Hb by an angle (45°, for example) will be called an "inspection camera 31e" where appropriate, as shown in FIGS. 6 and 7.

As described above, the imaging directions Dd to De differing from each other are set for the inspection cameras 31d and 31e. Meanwhile, focal positions FB of the inspection cameras 31d and 31e coincide with each other. Furthermore, the inspection cameras 31d and 31e are located in the orthogonal direction Do and the pivotal direction Dp by the upstream driver 39 (including the moving part 39a and the pivoting part 39b) so as to dispose the focal positions FB on a pitch circle PC of the gear Wb. This allows high-accuracy imaging of the upstream tooth surface Wb3 from the two directions: from a lateral side and an oblique side in the tangential direction to the pitch circle PC.

In this embodiment, for imaging of the upstream tooth surface Wb3 at the foregoing focal position FB from the tangent outside, the upstream tooth surface Wb3 of the gear Wb is illuminated from a plurality of directions and from outside in the tangential direction. More specifically, the inspection illuminators 32 are divided into two groups (a lateral illumination group and an oblique illumination group). Further, the inspection illuminators 32 in each group are spaced at a predetermined angular interval in the rotary direction Dw. In the following, to describe the inspection illuminators 32 in the upstream imaging mechanism 3B distinctively, three inspection illuminators 32 belonging to the lateral illumination group will be called an "inspection illuminator 32j," an "inspection illuminator 32k", and "an inspection illuminator 32l," where appropriate. Further, three inspection illuminators 32 belonging to the oblique illumination group will be called an "inspection illuminator 32m," an "inspection illuminator 32n", and "an inspection illuminator 32o," where appropriate.

The inspection illuminators 32j to 32o are configured to be turned on and off independently by the illumination controller 56 of the control unit 5. As shown in the upper section of FIG. 6, each of the inspection illuminators 32i to 32o illuminates the vicinity of the focal position FB of the inspection cameras 31d and 31e in spots. In this embodiment, all the inspection illuminators 32j to 32o emit illumination lights to the upstream tooth surface Wb3 along axes deviating from the optical axes of the inspection cameras 31d and 31e. Meanwhile, the inspection illuminators 32j to 32o may be configured in such a manner that some of the illumination lights are emitted to the upstream tooth surface Wb3 along the same axes as the optical axis of the inspection camera 31d or 31e.

FIG. 8 is a flowchart showing the operation of inspecting a workpiece by the inspection apparatus in FIG. 1. FIG. 9 schematically shows the inspecting operation. To clearly distinguish the operations of the holding tables 21A and 21B in FIG. 9, dots are given to the holding table 21B and a workpiece W held by the holding table 21B.

In the inspection apparatus 100, according to the inspection program stored in advance in the memory 52 of the control unit 5, the arithmetic processor 51 controls each part of the apparatus to execute the following operations. Here, various operations performed on the workpiece W will be described focusing on one workpiece W with reference to FIGS. 4 and 5. When the control unit 5 confirms that there is no workpiece W at the holding table 21A located at the pre-alignment position PA as shown in the section (a) of FIG. 5 and that the workpiece detection sensor 11 detects an uninspected workpiece W housed in the workpiece housing of the loading unit 1, the control unit 5 starts loading of the workpiece W onto the holding table 21A (step S1). In this loading step, the loader 12 grasps the uninspected workpiece W located in the workpiece housing and carries the uninspected workpiece W from the loading unit 1 to the holding table 21A. In the embodiment, for smoothly performing the loading step and a subsequent step of detecting misalignment, before the workpiece W is carried to the holding table 21A, the control unit 5 performs preparation for accepting the workpiece W in which the center axis AX2 of the chuck mechanism 22 and the rotary axis AX3 of the motor 241 are matched with each other by the horizontal positioning mechanism 23 as shown in the section (a) of FIG. 5 and the three movable members 221 to 223 are moved to get away from each other.

When the workpiece W is carried to the holding table 21A by the loader 12, the chuck mechanism 22 moves the three movable members 221 to 223 to get closer to each other as described above to pinch a part of the shaft Wa of the workpiece W and grasp the workpiece W. More specifically, during the loading operation, the movable members 221 to 223 are moved to get closer each other. While the respective upper end surfaces and the respective projection members 225 of the movable members 221 to 223 are engaged with the stepped part of the shaft Wa to match the center axis AX2 of the chuck mechanism 22 and the axis of the shaft Wa with each other, the workpiece W is held (see the section (b) of FIG. 5). In this way, the loading step is finished. At the time of the finish, the rotary axis AX3 of the motor 241, the center axis AX2 of the chuck mechanism 22, and the axis of the shaft Wa are matched with each other. However, in some case that the workpiece W is manufactured by forging or casting, the symmetry axis AX4 of the gear Wb is displaced from the axis of the shaft Wa to cause misalignment of the workpiece W with respect to the motor 241 as shown in the section (b) of FIG. 5, for example.

In this regard, in the embodiment, the uninspected workpiece W is illuminated by the alignment illuminator 28 (FIG. 2) and an image of the gear Wb is captured by the alignment camera 27 while the uninspected workpiece W is rotated by the motor 241 of the holding table 21A. Data about the image is stored into the memory 52 (step S2).

After this imaging is finished, the turning driver 262 makes a switch from the first position to the second position. More specifically, the turning driver 262 turns the support plate 261 180 degrees about the turning axis AX1. By doing so, as shown in the section (c) of FIG. 5, the holding table 21A holding the uninspected workpiece W is moved from the pre-alignment position PA to the inspection position PI and the elevator 254 moves the workpiece W to a height position at which an image of the workpiece W can be captured by the imaging unit 3 (step S3).

In the embodiment, in parallel with the foregoing movements, the image data about the workpiece W is read from the memory 52 and misalignment of the workpiece W with respect to the rotary mechanism 24 (motor 241) is detected (step S4). In the embodiment, the misalignment corresponds to information containing a displacement amount Δ and a displacement direction. Next, the misalignment is corrected at the holding table 21A (step S5). This misalignment correction is made by moving the chuck mechanism 22 using the horizontal positioning mechanism 23 so as to eliminate the misalignment detected in step S4 described above. By doing so, as shown in the section (c) of FIG. 5, the symmetry axis of the gear Wb and the rotary axis of the motor 241 are matched with each other at the time of arrival of the holding table 21A at the inspection position PI, or before or after the arrival. Thus, a workpiece imaging step (step S6) can be started immediately.

In step S6, the rotary mechanism 24 of the holding table 21A located at the inspection position PI is actuated to start workpiece rotation. In this step, the workpiece W held by the holding table 21A is in a so-called aligned state, which has undergone the foregoing misalignment correction, and rotates about the symmetry axis AX4. In response to this rotation, the plurality of inspection illuminators 32 are turned on to illuminate the rotating workpiece W from a plurality of directions. While the inspection illuminators 32 are turned on after the workpiece rotation, this is not the only timing for the turning-on. The turning-on of the inspection illuminators 32 may be started simultaneously with start of the rotation or before start of the rotation.

While the workpiece W is rotated and illuminated in this way, the inspection cameras 31 capture images of the workpiece W from various directions, and image data about the images of the workpiece W captured from a plurality of directions is transmitted to the control unit 5. More specifically, the inspection cameras 31a to 31c in the edge imaging mechanism 3A capture images of the addendum Wb1 of the gear Wb from three directions: from a lateral side, from an oblique side and an upper side in the radial direction of the gear. The inspection cameras 31d and 31e in the upstream imaging mechanism 3B capture images of the upstream tooth surface Wb3 from two directions: from a lateral side and from an oblique side in the tangential direction to the pitch circle PC. Further, an inspection camera 31f and an inspection camera 31g in the downstream imaging mechanism 3C capture images of the downstream tooth surface Wb5 from two directions: from a lateral side and from an oblique side in the tangential direction to the pitch circle PC. In this way, edge images, upstream tooth surface images, and downstream tooth surface images are acquired from many directions as images of the workpiece W, and data about the acquired images is transmitted to the control unit 5. The control unit 5 stores the transmitted image data into the memory 52, and inspects the workpiece W on the basis of the stored image data by following timing described below.

After the images are acquired in this way, the workpiece rotation is stopped at the holding table 21A, and the inspection illuminators 32 are turned off at the imaging unit 3. Further, the turning driver 262 turns the support plate 261 reversely 180 degrees about the turning axis AX1. By doing so, the holding table 21A is moved from the inspection position PI to the pre-alignment position PA while holding the inspected workpiece W. Further, the elevator 254 moves the workpiece W to its original height position (step S7). In parallel with this movement of the workpiece W, the control unit 5 reads the image data from the memory 52, and determines the presence or absence of scratches, defects, etc. at the gear Wb on the basis of the read workpiece images. In this way, workpiece inspection is conducted on the workpiece W held by the holding table 21A (step S8).

The workpiece W having returned to the pre-alignment position PA is grasped by the unloader 42. Thereafter, the workpiece W is released from the grasp by the movable members 221 to 223. Thus, the transfer of the workpiece W from the holding table 21A to the unloader 42 is carried out. Next, the unloader 42 carries the workpiece W to the unloading unit 4 and houses the workpiece W into the workpiece housing (not shown in the drawings) (step S9). The foregoing sequence of steps (steps S1 to S9) is performed repeatedly and alternately by the holding tables 21A and 21B.

As described above, in this embodiment, the dedicated edge imaging mechanism 3A, upstream imaging mechanism 3B, and downstream imaging mechanism 3C are provided for imaging of an edge of the addendum Wb1 (tooth tip), imaging of the upstream tooth surface Wb3 and imaging of the downstream tooth surface Wb5 of the workpiece W respectively. An edge image, an upstream tooth surface image and a downstream tooth surface image are separately acquired. This makes it possible to acquire an upstream tooth surface image and a downstream tooth surface image reliably even about a workpiece W that has caused difficultly in acquiring an upstream tooth surface image and a downstream tooth surface image using a single camera according to the conventional technique. Additionally, compared to the conventional technique of acquiring an edge image, an upstream tooth surface image, and a downstream tooth surface image collectively through imaging using a single camera, each of the acquired images can be captured clearly. The workpiece W is inspected on the basis of these images to achieve high-accuracy inspection of various types of workpieces W.

In the foregoing embodiment, an imaging direction differs between imaging subjects. More specifically, the edge imaging mechanism 3A is arranged so as to capture an image of an edge portion of the addendum Wb1 from outside in the radial direction. Meanwhile, the upstream imaging mechanism 3B and the downstream imaging mechanism 3C are arranged so as to capture images of the tooth surfaces Wb3 and Wb5 respectively from outside in the tangential direction to the pitch circle PC. By doing so, an edge image, an upstream tooth surface image, and a downstream tooth surface image are allowed to be acquired reliably to achieve increase in inspection accuracy.

In the foregoing embodiment, the focal position of the inspection camera 31 is located on the pitch circle PC in each of the edge imaging mechanism 3A, the upstream imaging mechanism 3B, and the downstream imaging mechanism 3C. By doing so, an edge image, an upstream tooth surface image, and a downstream tooth surface image are allowed to be acquired in an in-focus state to achieve increase in inspection accuracy, The upstream imaging mechanism 3B is capable of pivoting in the rotary direction Dw of the workpiece W about the focal position FB as a pivotal center. Thus, causing the upstream imaging mechanism 3B to pivot in the pivotal direction Dp using the pivoting part 39b allows imaging directions Dd and De to be responsive to the direction of a surface normal to the tooth surface Wb3. This allows the upstream imaging mechanism 3B to acquire upstream tooth surface images from directions always determined properly, so that the upstream tooth surface images are acquired favorably. This also applies to the downstream imaging mechanism 3C.

In each of the edge imaging mechanism 3A, the upstream imaging mechanism 3B, and the downstream imaging mechanism 3C, the inspection cameras 31 are arranged at different positions in the axis direction of the rotary axis AX3 of the rotary mechanism 24 to capture images of the workpiece W from imaging directions differing from each other. Such imaging of the workpiece W from a plurality of directions allows handling of various types of workpieces W to achieve the versatility of the inspection apparatus 100.

As shown in FIG. 6, the upstream imaging mechanism 3B and the downstream imaging mechanism 3C are arranged on the opposite side of the edge imaging mechanism 3A across the workpiece W. This allows provision of a large number of inspection cameras 31 and a large number of inspection illuminators 32 to achieve high-accuracy inspection of various types of workpieces W.

In the foregoing embodiment, all the inspection cameras 31a to 31g are arranged at higher positions than the pitch circle PC in the vertical direction, and all the imaging directions Da to Dg are pointed downwardly. Namely, all the inspection cameras 31a to 31g are installed while respective light-receiving surfaces (not shown in the drawings) are pointed downwardly. This makes it possible to reduce adherence of dust or dirt to the light-receiving surfaces effectively, thereby achieving favorable imaging of the workpiece W and achieving high maintenance performance.

In this embodiment, the addendum Wb1, the dedendum Wb2, the upstream tooth surface Wb3, the dedendum Wb4, and the downstream tooth surface Wb5 of the gear Wb correspond to examples of a "projection," a "recess adjacent to an upstream side of the projection," an "upstream wall surface," a "recess adjacent to a downstream side of the projection," and a "downstream wall surface" respectively of the present invention. An upstream tooth surface image and a downstream tooth surface image correspond to examples of an "upstream wall surface image" and a "downstream wall surface image" respectively of the present invention. The inspection cameras 31a to 31c each correspond to an example of an "edge imaging part" of the present invention. The inspection cameras 31d and 31e each correspond to an example of an "upstream imaging part" of the present invention. The inspection cameras 31f and 31g each correspond to an example of a "downstream imaging part" of the present invention. The arithmetic processor 51 of the control unit 5 functions as an "inspector" of the present invention. The pitch circle PC corresponds to an example of each of an "upstream path" and a "downstream path" of the present invention. Further, the focal positions FB and FC correspond to examples of an "upstream focal position" and a "downstream focal position" respectively of the present invention.

The present invention is not limited to the foregoing embodiment but can be changed in various ways other than those described above within a range not deviating from the substance of the invention. For example, in the foregoing embodiment, the pitch circle PC is used as the upstream path drawn by the upstream tooth surface Wb3 in response to the rotation of the workpiece W. However, the upstream path is not limited to such a pitch circle PC but may be a path drawn by any single point of the upstream tooth surface Wb3, for example. This also applies to the downstream path. In the foregoing embodiment, the pitch circle PC is used both as the "upstream path" and the "downstream path." Meanwhile, the upstream path and the downstream path may certainly be different paths.

In the foregoing embodiment, an inspection target is the workpiece W having the gear Wb. However, this is not the only type of the workpiece W but the "workpiece" of the present invention includes every type of workpiece having an outer peripheral portion of a rotationally symmetric shape about a symmetry axis with projections and recesses provided periodically and repeatedly.

The configuration of the foregoing embodiment is such that the workpiece W is held by the three movable members 221 to 223. Meanwhile, the workpiece W may be held in any manner and in any system. In the foregoing embodiment, the present invention is applied to the inspection apparatus 100 that detects misalignment while the two holding tables 21A and 21B are located alternately at the pre-alignment position PA. Meanwhile, the present invention is further applicable to an inspection apparatus including one, or three or more holding tables. As another example, the present invention is applicable to an apparatus that detects misalignment at an inspection position using the inspection camera 31c also functioning as an alignment camera.

In the foregoing embodiment, the number of the inspection cameras 31 provided in the edge imaging mechanism 3A, the upstream imaging mechanism 3B, and the downstream imaging mechanism 3C are "three," "two," and "two" respectively. However, the number of the inspection cameras 31 in the imaging mechanisms are not limited to such numbers but may be at least one or more in each imaging mechanism. This statement about the number of the inspection cameras 31 is further applicable to the number of the inspection illuminators 32. At least one or more inspection illuminators 32 may be provided in each of the edge imaging mechanism 3A, the upstream imaging mechanism 3B, and the downstream imaging mechanism 3C.

In the foregoing embodiment, the inspection illuminators 32 are turned on collectively. Meanwhile, the workpiece W may be rotated several turns and the inspection illuminator 32 to be turned on for imaging may be changed between the turns. By doing so, an edge image, an upstream tooth surface image, and a downstream tooth surface image are allowed to be acquired under various illumination conditions, and various defects on an appearance can be emphasized during the imaging.

Inspection based on an edge image, an upstream tooth surface image, and a downstream tooth surface image may be employed in a technique conventionally employed in many cases such as a technique of registering an image of a conforming item with the memory 52 in advance and conducting inspection through comparison with the image of the conforming item, for example. Further, inspection may be conducted on the basis of feature quantities in an edge image, an upstream tooth surface image, and a downstream tooth surface image, or using machine learning.

Although the invention has been described by way of the specific embodiments above, this description is not intended to be interpreted in a limited sense. By referring to the description of the invention, various modifications of the disclosed embodiments will become apparent to a person skilled in this art similarly to other embodiments of the invention. Hence, appended claims are thought to include these modifications and embodiments without departing from the true scope of the invention.

INDUSTRIAL APPLICABILITY

The present invention is applicable to inspection techniques in general for inspecting a workpiece having an outer periphery of a rotationally symmetric shape about a symmetry axis with projections and recesses provided periodically and repeatedly.

REFERENCE SIGNS LIST 3A edge imaging mechanism
3B upstream imaging mechanism
3C downstream imaging mechanism
5 control unit (inspector)
21A,21B holding table
31a-31c inspection camera (edge imaging part)
31d-31e inspection camera (upstream imaging part)
31f-31g inspection camera (downstream imaging part)
39b pivoting part
51 arithmetic processor (inspector)
100 inspection apparatus
AX3 rotary axis (of motor 241)
AX4 symmetry axis
Dw rotary direction
FB (upstream) focal position
FC (downstream) focal position
PC pitch circle (upstream path, downstream path)
W workpiece
Wb1 addendum (projection)
Wb2, Wb4 dedendum (recess)
Wb3 upstream tooth surface (upstream wall surface)
Wb5 downstream tooth surface (downstream wall surface)

The invention claimed is:

1. An inspection apparatus that inspects a workpiece having an outer peripheral portion of a rotationally symmetric shape about a symmetry axis with projections and recesses provided periodically and repeatedly, the apparatus comprising:

a holding table that rotates the workpiece about a rotary axis while holding the workpiece with the symmetry axis matched with the rotary axis;

an edge imaging mechanism that captures an image of an edge portion of a projection of the rotated workpiece;

an upstream imaging mechanism that captures an image of an upstream wall surface extending to the edge portion of the projection from a bottom of a recess adjacent to an upstream side of the projection in a rotary direction of the workpiece;

a downstream imaging mechanism that captures an image of a downstream wall surface extending to the edge portion of the projection from the bottom of a recess adjacent to a downstream side of the projection in the rotary direction; and an inspector that inspects the workpiece based on the image captured by the edge imaging mechanism, the upstream imaging mechanism, and the downstream imaging mechanism, wherein the edge imaging mechanism includes:
an edge imaging part which captures the image of the edge portion of the projection from outside in a radial direction of the workpiece; and
a plurality of edge illuminators which illuminate a vicinity of a focal position of the edge imaging part from directions different from each other from outside in the radial direction of the workpiece, wherein the edge imaging mechanism captures the image of the edge portion of the projection by the edge imaging part while turning on the edge illuminators in order every time the workpiece rotates, wherein the upstream imaging mechanism includes:
an upstream imaging part which captures, in response to rotation of the workpiece, the image of the upstream wall surface with an upstream focal position located on an upstream path from outside in a tangential direction to the upstream path drawn by the upstream wall surface; and
a plurality of upstream illuminators which illuminate a vicinity of an upstream focal position from directions differing from each other from outside in the tangential direction to the upstream path, wherein the upstream imaging mechanism captures the image of the upstream wall surface by the upstream imaging part while turning on the upstream illuminators in order every time the workpiece rotates, wherein the downstream imaging mechanism includes:
a downstream imaging part which captures, in response to the rotation of the workpiece, the image of the downstream wall surface with a downstream focal position located on a downstream path from outside in a tangential direction to the downstream path drawn by the downstream wall surface; and
a plurality of downstream illuminators which illuminate a vicinity of a downstream focal position from directions differing from each other from outside in the tangential direction to the downstream path, and wherein the downstream imaging mechanism captures the image of the downstream wall surface by the downstream imaging part while turning on the downstream illuminators in order every time the workpiece rotates.

2. The inspection apparatus according to claim 1, wherein the upstream imaging mechanism includes a plurality of upstream imaging parts including the upstream imaging part, and
the upstream imaging parts are arranged at different positions in an axis direction of the rotary axis so as to capture images at different angles relative to the upstream focal position.

3. The inspection apparatus according to claim 2, wherein the upstream imaging mechanism includes an upstream pivoting part that causes the upstream imaging mechanism to pivot in the rotary direction of the workpiece about the upstream focal position as a pivotal center.

4. The inspection apparatus according to claim 1, wherein the upstream imaging mechanism includes an upstream pivoting part that causes the upstream imaging mechanism to pivot in the rotary direction of the workpiece about the upstream focal position as a pivotal center.

5. The inspection apparatus according to claim 1, wherein the downstream imaging mechanism includes a plurality of downstream imaging parts including the downstream imaging part, and
the downstream imaging parts are arranged at different positions in an axis direction of the rotary axis so as to capture images at different angles relative to the downstream focal position.

6. The inspection apparatus according to claim 5, wherein the downstream imaging mechanism includes a downstream pivoting part that causes the downstream imaging mechanism to pivot in the rotary direction of the workpiece about the downstream focal position as a pivotal center.

7. The inspection apparatus according to claim 1, wherein the downstream imaging mechanism includes a downstream pivoting part that causes the downstream imaging mechanism to pivot in the rotary direction of the workpiece about the downstream focal position as a pivotal center.

8. The inspection apparatus according to claim 1, wherein the edge imaging mechanism includes a plurality of edge imaging parts, including the edge imaging part, that capture images of the edge portion of the projection, and
the edge imaging parts are arranged at different positions in an axis direction of the rotary axis so as to capture images of the edge portion of the projection at different angles.

9. The inspection apparatus according to claim 1, wherein the upstream imaging mechanism and the downstream imaging mechanism are arranged on the opposite side of the edge imaging mechanism across the workpiece.

10. An inspection method of inspecting a workpiece having an outer peripheral portion of a rotationally symmetric shape about a symmetry axis with projections and recesses provided periodically and repeatedly, the method comprising:
a step of causing an edge imaging mechanism to capture an image of an edge portion of a projection of the workpiece to acquire an edge image, causing an upstream imaging mechanism to capture an image of an upstream wall surface extending to the edge portion of the projection from a bottom of a recess adjacent to an upstream side of the projection in a rotary direction of the workpiece to acquire an upstream wall surface image, and causing a downstream imaging mechanism to capture an image of a downstream wall surface extending to the edge portion of the projection from the bottom of a recess adjacent to a downstream side of the projection in the rotary direction to acquire a downstream wall surface image, while holding the workpiece and rotating the workpiece about a rotary axis with the symmetry axis matched with the rotary axis; and a step of inspecting the workpiece based on the edge image, the upstream wall surface image, and the downstream wall surface image, wherein the edge imaging mechanism includes:
- an edge imaging part which captures the image of the edge portion of the projection from outside in a radial direction of the workpiece; and
- a plurality of edge illuminators which illuminate a vicinity of a focal position of the edge imaging part from directions different from each other from outside in the radial direction of the workpiece, wherein the edge imaging mechanism captures the image of the edge portion of the projection by the edge imaging part while turning on the edge illuminators in order every time the workpiece rotates, wherein the upstream imaging mechanism includes:
- an upstream imaging part which captures, in response to rotation of the workpiece, the image of the upstream wall surface with an upstream focal position located on an upstream path from outside in a tangential direction to the upstream path drawn by the upstream wall surface; and
- a plurality of upstream illuminators which illuminate a vicinity of an upstream focal position from directions differing from each other from outside in the tangential direction to the upstream path, wherein the upstream imaging mechanism captures the image of the upstream wall surface by the upstream imaging part while turning on the upstream illuminators in order every time the workpiece rotates, wherein the downstream imaging mechanism includes:
- a downstream imaging part which captures, in response to the rotation of the workpiece, the image of the downstream wall surface with a downstream focal position located on a downstream path from outside in a tangential direction to the downstream path drawn by the downstream wall surface; and
- a plurality of downstream illuminators which illuminate a vicinity of a downstream focal position from directions differing from each other from outside in the tangential direction to the downstream path, and wherein the downstream imaging mechanism captures the image of the downstream wall surface by the downstream imaging part while turning on the downstream illuminators in order every time the workpiece rotates.

* * * * *